United States Patent
Schüle et al.

(10) Patent No.: US 10,253,973 B2
(45) Date of Patent: Apr. 9, 2019

(54) SYSTEM FOR COMBINED FLUE GAS HEAT RECOVERY AND DUST PRECIPITATION IMPROVEMENT AS RETROFIT SOLUTION FOR EXISTING COAL-FIRED POWER STATIONS

(75) Inventors: Volker Schüle, Leimen (DE); Daniel Zimmer, Mannheim (DE)

(73) Assignee: General Electric Technology GmbH, Baden (CH)

( * ) Notice: Subject to any disclaimer, the term of this patent is extended or adjusted under 35 U.S.C. 154(b) by 123 days.

(21) Appl. No.: 13/522,733

(22) PCT Filed: Jan. 17, 2011

(86) PCT No.: PCT/EP2011/000163
§ 371 (c)(1),
(2), (4) Date: Oct. 10, 2012

(87) PCT Pub. No.: WO2011/086002
PCT Pub. Date: Jul. 21, 2011

(65) Prior Publication Data
US 2013/0192540 A1    Aug. 1, 2013

(30) Foreign Application Priority Data

Jan. 18, 2010  (EP) .................................. 10000395

(51) Int. Cl.
| | | |
|---|---|---|
| *B03C 3/017* | (2006.01) |
| *F22D 1/38* | (2006.01) |
| *F23J 15/02* | (2006.01) |
| *B03C 3/02* | (2006.01) |
| *F22B 37/00* | (2006.01) |
| *F22D 1/18* | (2006.01) |
| *F23J 15/06* | (2006.01) |
| *F22B 1/00* | (2006.01) |
| *F23L 15/04* | (2006.01) |

(52) U.S. Cl.
CPC ................. *F22D 1/38* (2013.01); *B03C 3/017* (2013.01); *B03C 3/025* (2013.01); *F22B 1/00* (2013.01);
(Continued)

(58) Field of Classification Search
CPC ......... F23L 15/00; F23L 15/02; F23L 15/045; F23L 15/04; B03C 3/025; B03C 3/017; F22B 1/00; F22B 37/008; F22D 1/18; F22D 1/38; F23J 15/022; F23J 15/025; F23J 15/06; Y02E 20/363
(Continued)

(56) References Cited

U.S. PATENT DOCUMENTS 4,057,966 A * 11/1977 Prutkovsky et al. ........... 60/678
4,582,122 A    4/1986 Fan
(Continued)

FOREIGN PATENT DOCUMENTS

FR    2 583 304    12/1986
JP       634835 A    1/1988
(Continued)

*Primary Examiner* — Steven B McAllister
*Assistant Examiner* — Benjamin W Johnson
(74) *Attorney, Agent, or Firm* — GE Global Patent Operation; Marc A. Vivenzio

(57) ABSTRACT

A power plant is suggested with an additional heat transfer between the flue gas that flows through a flue gas line (5) and the feed-water in a feed-water line (19). The claimed arrangement of the first heat exchanger (13) upstream and adjacent to a precipitator (7) leads to a reduced space demand and optimizes dust precipitation as well as the pressure drop of the flue gas.

5 Claims, 3 Drawing Sheets

(52) U.S. Cl.
CPC .............. *F22B 37/008* (2013.01); *F22D 1/18* (2013.01); *F23J 15/022* (2013.01); *F23J 15/025* (2013.01); *F23J 15/06* (2013.01); *F23L 15/04* (2013.01); *F23L 15/045* (2013.01); *Y02E 20/363* (2013.01)

(58) Field of Classification Search
USPC .......... 122/1 A, 412, 414, 420, 1 C; 110/216
See application file for complete search history.

(56) References Cited

U.S. PATENT DOCUMENTS

| | | | |
|---|---|---|---|
| 4,987,839 A | * | 1/1991 | Krigmont ............... B03C 3/013 110/216 |
| 5,282,429 A | | 2/1994 | Kato et al. |
| 5,293,841 A | | 3/1994 | Suhr et al. |
| 5,538,539 A | * | 7/1996 | Spokoyny et al. ............... 96/52 |
| 5,878,675 A | | 3/1999 | Iijima et al. |
| 6,964,698 B1 | * | 11/2005 | Davis ...................... B03C 3/36 96/52 |
| 2003/0014977 A1 | * | 1/2003 | Doebbeling et al. ........... 60/775 |
| 2005/0132880 A1 | * | 6/2005 | Chang ............... 95/63 |
| 2006/0144043 A1 | | 7/2006 | Takeuchi et al. |
| 2006/0254251 A1 | * | 11/2006 | Yamada ...................... 60/39.19 |
| 2009/0078177 A1 | * | 3/2009 | Wu et al. ...................... 110/233 |

FOREIGN PATENT DOCUMENTS

| | | | |
|---|---|---|---|
| JP | 0370907 A | | 3/1991 |
| JP | 07275652 A | * | 10/1995 |
| JP | 11-169746 | | 6/1999 |
| JP | 11169746 | * | 6/1999 |
| JP | 2002-370012 | | 12/2002 |
| RU | 2078274 C1 | | 4/1997 |

* cited by examiner

SYSTEM FOR COMBINED FLUE GAS HEAT RECOVERY AND DUST PRECIPITATION IMPROVEMENT AS RETROFIT SOLUTION FOR EXISTING COAL-FIRED POWER STATIONS

The invention relates to an arrangement for utilizing the heat contained in the flue gas of a steam power station and improving the dust precipitation preferably as a retrofit solution for existing coal-fired power stations.

BACKGROUND

Heat recovery from the flue gas is a well known technique using so-called air heaters that transfer heat from the flue gas leaving the boiler to the primary air that is necessary to burn the fuel, for example coal, in the boiler.

Further on from U.S. Pat. No. 5,293,841 a heat shifting unit is known that shifts additional heat from the flue gas to the primary air using two heat exchangers, one of them being connected to the flue gas line and the other being connected in the primary air line. The heat is transferred between these two heat exchangers by means of a heat carrying medium that flows through both heat exchangers in a closed loop.

Both the air pre-heater and the above described heat shifting unit transfer heat from the flue gas to the primary air.

From U.S. Pat. No. 5,293,841 a first heat exchanger is known, transferring heat from the flue gas to the feed-water of the power plant. This first heat exchanger is integrated in a bypass of the air heater and an additional second heat exchanger for feed-water heating in series with the condenser and low pressure (LP) feed-water heaters. This arrangement does not allow efficient flexible operation in terms of variable heat transfer due to load and unit operation time changes as well as temperature changes. Further on, this arrangement requires a lot of space, making the arrangement not applicable as a retrofit solution in existing power stations.

Consequently, it is the object of the claimed invention to allow the heat transfer between the flue gas and the feed-water with little extra space needed in the flue gas line of the power plant resulting in a better applicability and the possibility to install a heat exchanger between the flue gas and the feed-water in existing power plants resulting in an improved overall efficiency and dust precipitation of the flue gas.

This object is solved by a power plant comprising a boiler, a flue gas line, a precipitator system and a first heat exchanger, whereby the heat exchanger is installed upstream of the precipitator system in the flue gas line by installing the heat exchanger adjacent to the precipitator system having either horizontal or vertical gas flow.

The claimed invention allows a flexible as well as an efficient operation of the power plant at different load points.

An advantageous embodiment of the claimed invention is characterized in, that upstream of the first heat exchanger a diffuser is installed, and that the heat exchanger and a precipitator system use that same diffuser and the gas flow is horizontal. This saves costs and reduces the space required for installing the first heat exchanger. Typically there will be more than one heat exchanger in parallel. The number of heat exchangers in parallel depends on the number of precipitator passes in parallel.

SUMMARY

Since in the first heat exchanger no leakage between the two heat exchanger media (flue gas and liquid heat transfer medium) should occur, the first heat exchanger is preferably a tubular heat exchanger or a plate heat exchanger.

To be able to extract heat from flue gas by means of the first heat exchanger with reasonable flue gas pressure drop it is necessary to reduce the flow velocity of the flue gas inside the first heat exchanger. This can be achieved by means of a diffuser. Reducing the pressure drop is of great importance if the invention is applied in existing power stations since the pressurising capability of the existing fan in the flue gas line is often limited. For these reasons a diffuser upstream of the first heat exchanger is necessary. It is apparent that such a diffuser requires space.

Since the claimed first heat exchanger is positioned between air heater and dust precipitator system (ESP or bag house), the invention reduces the required space in flow direction of the flue gas by integrating the first heat exchanger into the upstream side of the precipitator system. This arrangement avoids an outlet hood for the first heat exchanger as well as the inlet hood for the precipitator system. Consequently, the overall space demand and the costs for installing the inventive heat exchanger are significantly reduced.

A further cost reduction can be achieved with the claimed arrangement since the first heat exchanger serves as inlet screen plate for the precipitator system. This applies to a great extent if the first heat exchanger is a plate heat exchanger or a tubular heat exchanger. Heat exchangers of these types distribute the flue gas coming from the flue gas line and the diffuser over the whole cross section of the first heat exchanger and of the precipitator that is installed downstream the first heat exchanger. For this reason separate inlet screen plates for the precipitator system are no longer necessary. This also leads to a reduction of the space requirement and the costs.

Further on, the pressure drop of the inlet screen plates can be avoided and consequently the performance needed for a fan in the flue gas line can be reduced or at least increased less.

Further advantageous embodiments of the claimed power plant are characterized in, that the first heat exchanger transfers heat from the flue gas to a heat transfer medium, preferably a liquid heat transfer medium, like water or a thermal oil. Having transferred the heat from the flue gas to the heat transfer medium this heat is available for use at several places in the power station.

One very advantageous use of this heat recovered from the flue gas is to raise the temperature of the feed-water. For this purpose a second heat exchanger is connected in parallel to one or more feed-water heaters of the feed-water line of the water-steam cycle of the power station. This second heat exchanger transfers heat from the heat transfer medium to the feed-water. This configuration allows a great flexibility in running the power station with regard to load and increase or decrease of load.

In a further preferred embodiment of the claimed invention the precipitator system comprises a dry precipitator, namely an electrostatic precipitator (ESP).

A further additional flexibility of the claimed invention can be reached if the flue gas enters in a vertical direction into the first heat exchanger and is deflected between the first heat exchanger and the precipitator system in a horizontal direction. This allows mainly in retrofit installations to realize the claimed invention in case it is advantageous if the flue gas enters and flows through the first heat exchanger in a vertical direction. Of course, if enough space is available, it is preferred that the flue gas flows through the first heat exchanger and the precipitator system mainly without deflection of the flue gas. This reduces the pressure drop of the flue gas and reduces the load of the flue gas fan.

To reduce the temperature of the flue gas and raise the overall efficiency of the power plant in a further advantageous embodiment downstream of the boiler and upstream of the first heat exchanger the flue gas flows through an air heater raising the temperature of the primary air before entering into the boiler.

Further advantages and details are described below in conjunction with the drawings.

DETAILED DESCRIPTION

Figure 1:
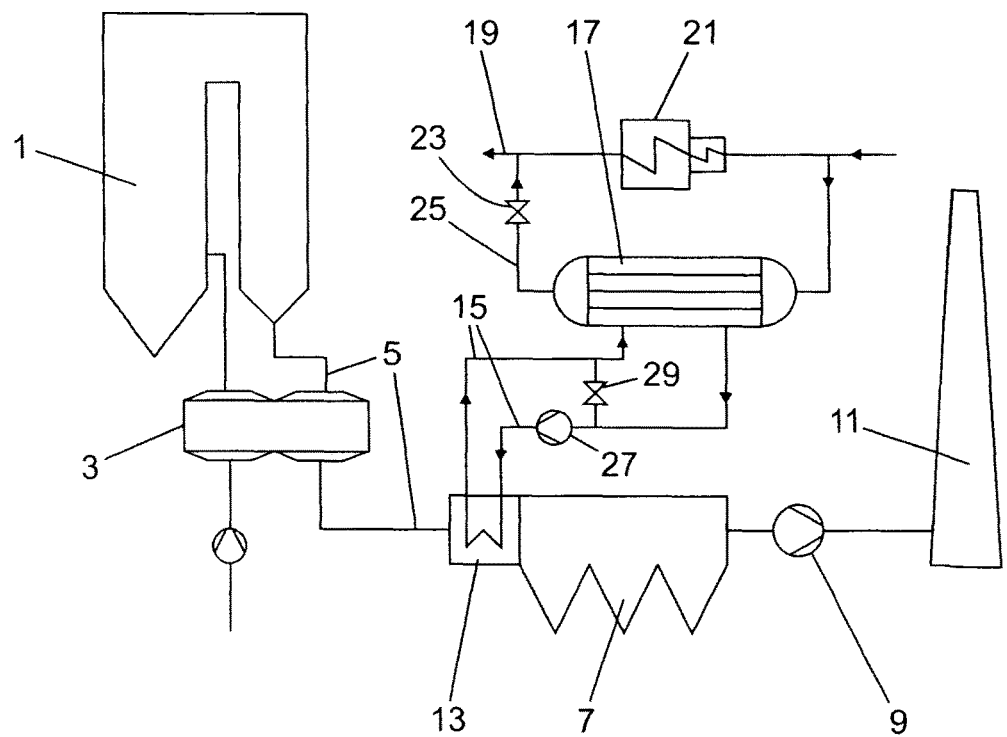
FIG. 1 an embodiment of the claimed power plant.

FIG. 1 shows an embodiment of the claimed invention consisting of a combined system to recover heat from flue gas downstream an air heater and to improve the dust precipitation of the flue gas in a fired steam power plant.

The claimed power plant comprises a boiler 1 that may be fired by coal. The combustion air flows through an air heater 3 which is heated by the flue gas that flows through a flue gas line 5. In the boiler feed-water is converted into steam thereby raising the pressure by raising the temperature of the feed-water that enters the boiler.

Since the boiler 1 of a conventional fossil fuel fired power plant works is well known to a man skilled in the art, the boiler 1 and the feed-water and steam circulation inside the power plant are not described in detail. In FIG. 1 only the components that are of relevance with regard to the claimed invention are schematically shown and will be described in more detail.

The flue gas that exits from the boiler 1 with a temperature of about 350° Celsius transfers heat in the air heater 3 to the combustion air. After having passed the air heater 3, the flue gas in the flue gas line 5 has a temperature of approximately 130° to 160° Celsius. The temperature of the combustion air is raised when the combustion air flows through the air heater accordingly.

Since the flue gas that has passed the air preheater still contains particles and pollutant components the flue gas will be cleaned for example in a dust precipitator 7, which can be a so called electrostatic precipitator (ESP), a so called baghouse or any other type of precipitator. After having passed the precipitator 7 an induced draft IDfan 9 raises the pressure of the flue gas in the flue gas line 5 and transports it through a stack 11 into the ambient air.

The claimed invention further comprises a first heat exchanger 13 upstream of the precipitator 7 and directly connected to the precipitator 7. This first heat exchanger serves to cool the flue gas that flows through the flue gas line 5. The heat that has been extracted from the flue gas in the first heat exchanger 13 is transferred to a thermal energy carrier that flows through conduits 15 to a second heat exchanger 17. The second heat exchanger 17 may be a shell and tube heat exchanger. The shell of the second heat exchanger 17 is connected to the conduits 15 and consequently the heat transfer medium that flows to the conduits 15 also flows through the shell of the second heat exchanger 17.

On the other side the second heat exchanger 17 is connected to a feed-water line 19. The feed-water line 19 starts at the condenser (not shown) of the power plant and finally enters the boiler 1 (not shown). On its way from the condenser to the boiler 1 the feed-water that flows through the feed-water line is raised in temperature by several feed-water heaters, starting for example with a first low pressure (LP) feed-water heater 21.

As can be seen the second heat exchanger 17 is arranged parallel to the first feed-water heater 21 and its tubes are connected to the feed-water line 19 by a bypass line 25. Consequently a part of the feed-water that flows through the feed-water line 19 passes the second heat exchanger 17. For purposes of control of the flow through the second heat exchanger 17 a control valve 23 can be installed in the bypass line 25.

This leads to a great flexibility of the feed-water flow through the second heat exchanger 17 and consequently to an improved behaviour of the power plant and its overall efficiency, since an optimized heat transfer from the flue gas to the feed-water can be achieved by controlling the flow through valve 23 through the bypass line 25. Further improved control of the heat transfer can be achieved if the flow rate through the conduits is controlled. This can be achieved by means of pump 27 and/or a valve 29. The pump 27 is preferably of the variable speed type.

As mentioned above the heat transfer from the flue gas to the feed-water using the first heat exchanger 13, the conduits 15, and the second heat exchanger 17 improves the overall efficiency of the power plant and consequently improves the performance and/or reduces the fuel consumption of the power plant.

A further very important aspect of the claimed invention is that due to the reduction of the temperature of the flue gas in the first heat exchanger 17 the volume flow of the flue gas is reduced and therefore the average velocity of the flue gas in the precipitator is also reduced. This leads to reduced pressure losses in the precipitator and an improved purification efficiency of the precipitator. Especially for low-sulfur coals the precipitation efficiency is strongly improved by means of temperature reduction and thereby decrease of dust resistivity. Since the flue gas volume flow rate is decreased the load of the fan 9 is at least not significantly raised by adding the pressure drop creating first heat exchanger 13 in the flue gas line 5.

The gains in terms of unit efficiency rise are realized by transferring the recovered heat from flue gas into the feed-water of the water-steam cycle. This is done via the intermediate cycle 15, which is connected to the first heat exchanger 13 and the second heat exchanger 17. The second heat exchanger is installed in parallel to one or more of the existing feed-water heaters 21.

The feed-water heaters 21 are partly bypassed and consequently extract less steam from the turbine. This reduced steam consumption of the feed-water heaters 21 directly contributes to additional power generation and/or raises unit efficiency.

Figure 2:
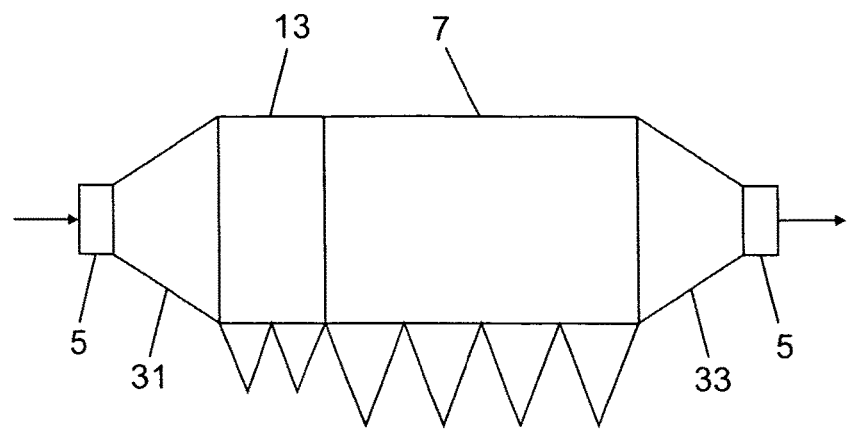
FIG. 2 an inventive flue gas cooler and precipitator with horizontal gas flow.

To be able to carry out heat recovery from flue gas with reasonable flue gas pressure drop it is necessary to reduce the flow velocity inside of the first heat exchanger 13. In FIG. 2 such an arrangement is shown for horizontal gas flow. As can be seen from FIG. 2 between the flue gas line 5 and the first heat exchanger 13 upstream of the first heat exchanger 13 is a diffuser 31 that leads to a reduction of velocity of the flue gas inside the first heat exchanger 13 and the precipitator 7, that is installed adjacent and downstream of the first heat exchanger 13. Downstream of the precipitator 7 there is the need of reducing the volume of the flue gas line 5 which leads to the installation of a concentrator 33. The concentrator 33 raises the velocity of the flue gas so that the cross-section of the flue gas line 5 upstream and downstream of the heat exchanger 13 and the precipitator 7 are similar.

Figure 3:
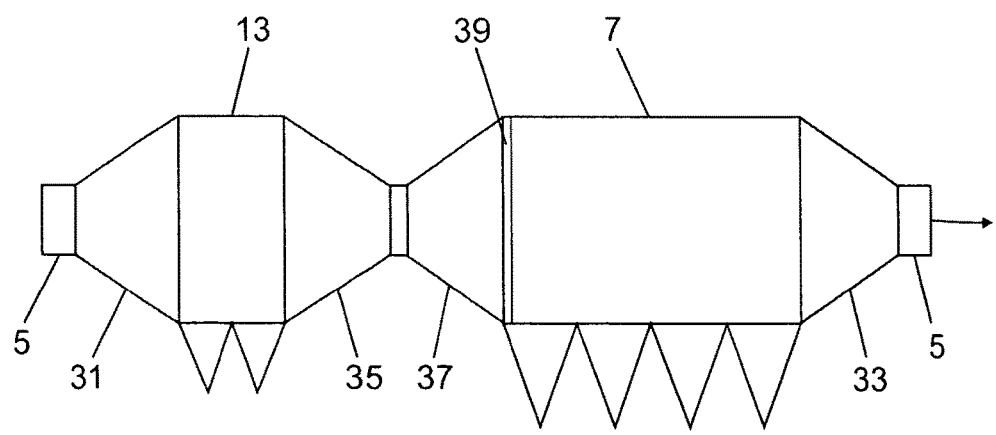
FIG. 3 a flue gas cooler and a separate precipitator.

For reasons of comparison in FIG. 3 a less optimal configuration of a first heat exchanger 13 and a precipitator 7 is shown. In this configuration the first heat exchanger 13 and the precipitator 7 are not installed adjacent to each other. In this configuration between the first heat exchanger 13 and the precipitator 7 an additional concentrator 35 and an additional diffuser 37 are required. This would lead to an additional pressure drop in the flue gas and of course resulting in additional costs for building and installing the components 35 and 37.

Further on the space that is required for installing the inventive first heat exchanger increases in the configuration shown in FIG. 3 compared to the preferred configuration of FIG. 2. Further on, if the configuration according to FIG. 3 were realized between the second diffuser 37 and the precipitator 7 an inlet screen plate 39 were required for a better distribution of the flue gas in the precipitator 7.

To summarize, the arrangement shown in FIG. 2 leads to some major advantages which are mainly, a compact and efficient design, with reduced costs for building and installation. This aspect is of great importance with regard to retrofit in existing power plants, since normally the available space in existing power plants is rare and therefore a compact solution is highly appreciated.

Further on, the pressure drop of the flue gas in the installation shown in FIG. 2 is rather small compared to an installation without first heat exchanger 13, since the pressure drop caused by the first heat exchanger 13 is at least partially compensated by the fact, that no inlet screen plate 39 (see FIG. 3) is required. Consequently in almost each case the ID-fan 9 may remain unchanged and therefore the investment for installing the inventive heat transfer from the flue gas to the feed-water is reduced.

Preferably the first heat exchanger is a so called tubular heat exchanger or plate heat exchanger. The flue gas that flows through the diffuser 31 and the first heat exchanger 13 is automatically distributed equally over the whole cross section area of the precipitator 7. Consequently no inlet screen plates are necessary. Consequently the pressure drop that is normally caused by the inlet screen plates is avoided and therefore at least a part of the pressure drop caused by the first heat exchanger 13 in the flue gas is compensated by avoiding the inlet screen plate.

Figure 4:
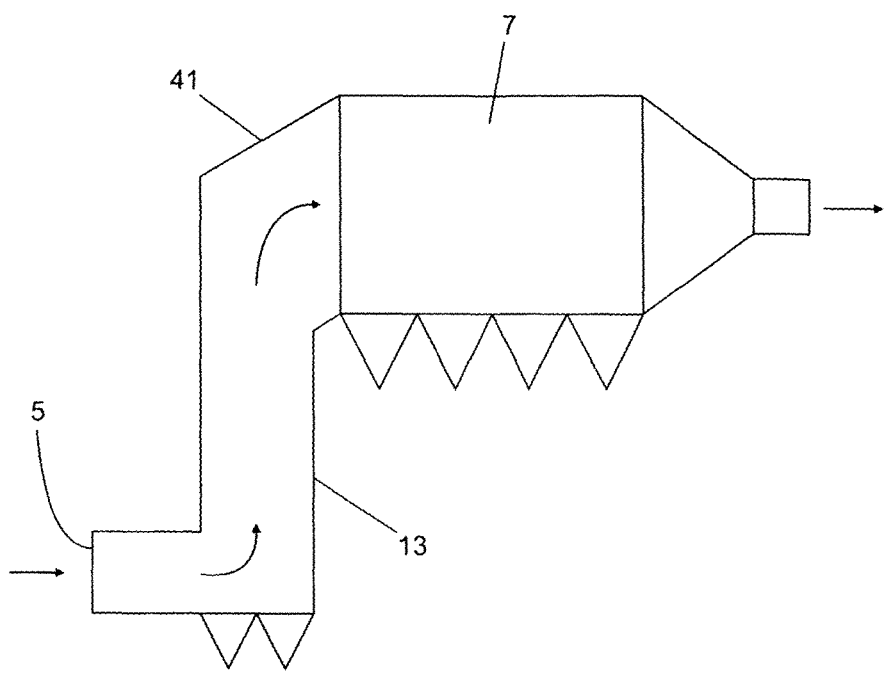
FIG. 4 an embodiment showing a flue gas cooler with vertical flue gas flow.

In FIG. 4 a second embodiment of the combination of first heat exchanger 13 and precipitator 7 are shown. In this embodiment the flue gas 5 flows through the first heat exchanger 13 in a vertical direction and is deflected by a deflector 41 and then enters the precipitator 7 in a more or less horizontal direction. The tubes or plates inside the first heat exchanger 13 as well as the filter interiors of the precipitator are not shown in FIG. 4, since these components are known to a man skilled in the art.

The claimed invention leads to an improved purification efficiency of the precipitator 7 and improved overall efficiency of the power plant due to the heat transfer from the flue gas to the feed-water.

Further on the claimed invention needs only a little additional space upstream and adjacent of the precipitator 7 and therefore can be installed as a retrofit solution in a great number of existing coal-fired steam plants. Since the pressure drop of the flue gas due to the additional first heat exchanger 13 can be kept in a reasonable range the existing fan 9 of the flue gas can remain unchanged. Consequently the investment costs for a retrofit solution are rather attractive compared to the gain of overall efficiency and therefore reduced fuel costs.

What is claimed is:

1. A power plant having a boiler for combusting carbonaceous fuel and generating flue gas having dust disposed therein, said power plant comprising:
   a flue gas line to convey flue gas;
   a diffuser to receive and diffuse flue gas from the flue gas line;
   a first heat exchanger in fluid communication with the diffuser to receive and cool flue gas from the diffuser;
   a dust precipitator abuttingly connected to the first heat exchanger to receive flue gas from the first heat exchanger and remove dust from the flue gas received from the heat exchanger;
   an induced draft fan downstream of the dust precipitator for raising the pressure of flue gas exiting the dust precipitator and transporting the flue gas exiting the dust precipitator towards an outlet stack; and
   a second heat exchanger in parallel to a first feedwater heater, wherein heat extracted from flue gas passing through the first heat exchanger is transferred to a thermal energy carrier that flows through conduits to the second heat exchanger, and wherein the second heat exchanger is configured to heat feedwater bypassing the first feedwater heater with heat from the thermal energy carrier,
   wherein the diffuser and the first heat exchanger are disposed upstream of the dust precipitator system, the diffuser is configured to reduce a velocity of flue gas flowing to both the first heat exchanger and the dust precipitator, and
   wherein the first heat exchanger and the dust precipitator define respective cross-sections where the first heat exchanger and the dust precipitator directly abuttingly connect, and the respective cross sections are the same.

2. The power plant according to claim 1, wherein the dust precipitator is an electrostatic precipitator.

3. The power plant according to claim 1, wherein flue gas enters in a horizontal direction into the first heat exchanger and the dust precipitator.

4. The power plant according to claim 1, further comprising: an air heater to receive flue gas therethrough, the air heater located downstream of the boiler and upstream of the first heat exchanger.

5. The power plant according to claim 1, wherein a velocity of flue gas exiting the first heat exchanger is approximately the same as a velocity of flue gas entering the dust precipitator.

* * * * *